June 9, 1959 — J. H. McAULEY — 2,889,915
SPROCKET CHAIN
Filed May 8, 1958 — 2 Sheets-Sheet 1

INVENTOR.
JAMES H. McAULEY
BY CORBETT, MAHONEY, MILLER & RAMBO, ATTY'S.

June 9, 1959  J. H. McAULEY  2,889,915
SPROCKET CHAIN

Filed May 8, 1958 2 Sheets-Sheet 2

INVENTOR.
JAMES H. McAULEY
BY
CORBETT, MAHONEY, MILLER & RAMBO, ATTY'S.
BY
Wm. V. Miller United States Patent Office 2,889,915
Patented June 9, 1959

2,889,915

SPROCKET CHAIN

James H. McAuley, Bremen, Ohio, assignor to McAuley Manufacturing, Inc., Bremen, Ohio, a corporation of Ohio Application May 8, 1958, Serial No. 733,918

3 Claims. (Cl. 198—176)

My invention relates to a sprocket chain. It has to do, more particularly, with a chain which is particularly suitable for moving loose granular material, such as chicken feed, along a feed conduit extending in both horizontal and vertical directions.

In Patent No. 2,672,059 to Graetz et al., there is disclosed a flat sprocket chain which is made economically of interlocking links formed of stampings. The chain disclosed in that patent has been very successful in use in chicken feeders to move the feed along horizontal conduits or troughs. Such a chain can not only pass around a sprocket, disposed in a plane normal to the flat plane of the chain, but can also flex laterally during its travel between the sprockets over which it passes. Furthermore, this chain is capable of being twisted about its longitudinal axis. Although this chain is successful in moving the chicken feed along horizontal troughs, it is also desirable to have a chain which can move the feed vertically from one level to another, for example, when the chain is used in a chicken-house having several levels where it is desired to have the feed troughs.

It is, therefore, an object of the present invention to provide a chain having all of the features mentioned above in connection with the previously patented chain but which has the additional feature that it can be used in moving the chicken feed vertically.

Various other objects will be apparent.

The accompanying drawings illustrate the preferred embodiment of my invention but it is to be understood that specific details thereof may be varied without departing from the basic principles of my invention.

Figure 1:
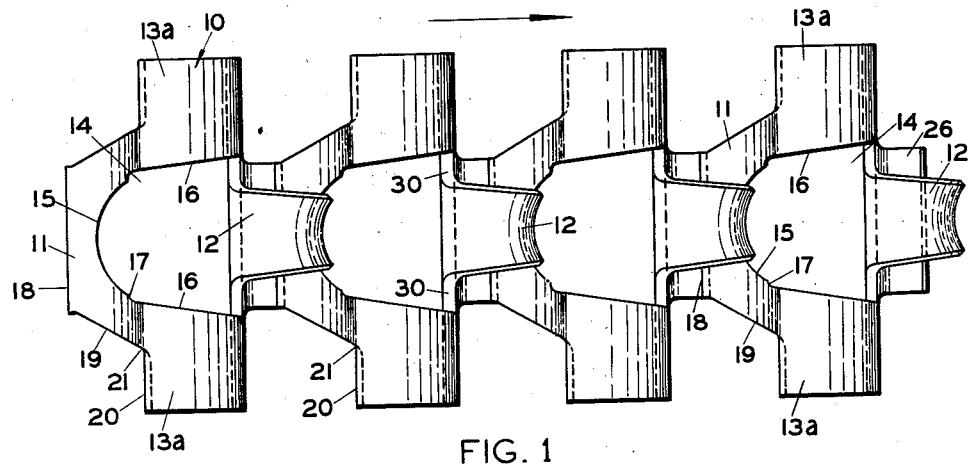
Figure 1 is a plan view of a length of chain formed according to my invention.

With reference to the drawings, I have illustrated in Figure 1 a flat chain composed of the interlocking links 10 which are so connected together that the links may pivot relative to each other vertically at right angles to the plane of the links, may swing relative to each other horizontally in the plane of the links, or may twist relative to each other about the longitudinal axis of the chain. An important feature of this present invention is that each link is provided with what I will term a "dozer" blade which will extend transversely of the path of movement of the chain and normal to the plane of movement of the chain. Therefore, when the chain is traveling in a horizontal trough or conduit, the blades on the successive links will move the chicken feed along the bottom of the trough. On the other hand, when the chain is moving up an incline or in a vertical direction through a conduit, the blades will serve as elevators for lifting the material through the vertical conduit.

Each of the links 10 takes the form illustrated in the drawings. Each link is formed by a stamping operation from suitable sheet metal and consists of a flat pintle portion 11 at one end and a hook-shaped barrel portion 12 at the other end which are joined together by a central connecting body portion 13. The portion 13 projects laterally in both directions to a substantial extent beyond the extent of the pintle portion 11 to provide the lateral wings 13a. It will be apparent that in stamping out the barrel portion 12, a central aperture 14 is formed which will receive the tooth of the chain sprocket as it moves into engagement with the barrel portion 12. This opening 14 separates the link transversely to provide the two side wings 13a which connect the pintle portion 11 to the barrel 12. The pintle 11 is provided with the inside concavely curved edge 15 which is joined to the outwardly diverging inner edges 16 of the side members 13a at the chamfered points 17. The rear edge 18 of the pintle 11 is transversely straight and merges with the forwardly diverging outer edges 19 which connect with the rear edges 20 of the wings 13a as indicated at 21.

Figure 3:
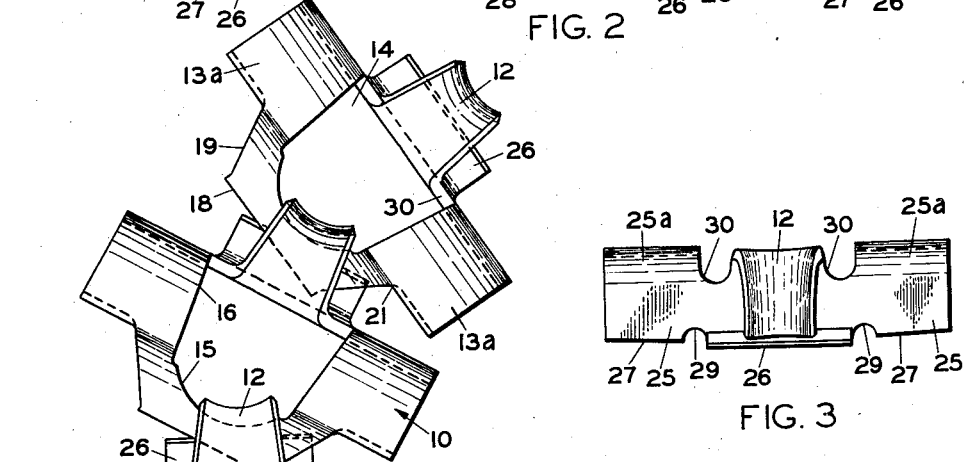
Figure 3 is an end elevational view of the barrel hook end of one of the links.

At the forward side of the connecting portion 13, there is provided a material moving or dozer blade 25 which extends continuously across the chain link, the barrel portion 12 being extended forwardly from the upper edge thereof. This blade 25 provides at each side of the barrel 12, as shown in Figure 3, the material moving blade portions 25a which are extensions forwardly and downwardly of the wings 13a. The lower edge of the blade 25 is provided with a forwardly extending bearing lip 26 which is at a slightly lower level than the extremities 27 of the blade portions 25a. It will be noted that the lip portion 26 extends upwardly slightly to prevent digging into the bottom of the feed trough. These blade portions 25a are in a plane normal to the plane of the flat pintle portion 11.

The barrel portion 12 is in the form of a hook which extends forwardly, downwardly and then rearwardly until its rear edge almost meets the forward extremity of the lip 26 but is spaced slightly therefrom to provide a transverse slot 28. At each end of the lip 26 between it and the adjacent lower extremity of the blade portion 25a is a semi-circular notch 29. Similar notches 30 are provided at each side of the upper portion of the barrel 12 between it and the adjacent blade portion 25a, all of these notches being provided to prevent fracture at these corners.

It will be noted that the hook-shaped barrel portion 12 is concavely curved on its outer surface in order to give it more strength and to align the chain link with the sprocket as the tooth engages the barrel portion. This also provides an inner curved convex pintle-engaging bearing surface 30. It will further be noted that the barrel portion 12 is of substantially less width than the aperture 14.

Figure 2:
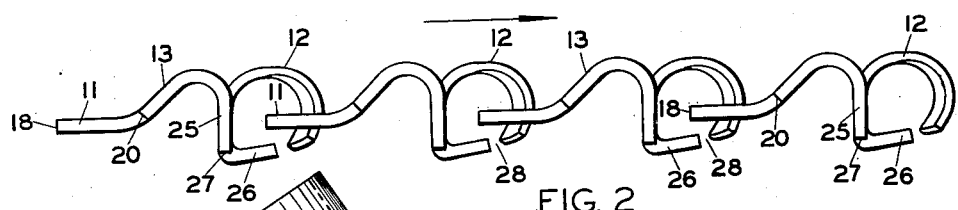
Figure 2 is a side elevational view of the chain of Figure 1.
Figure 7:
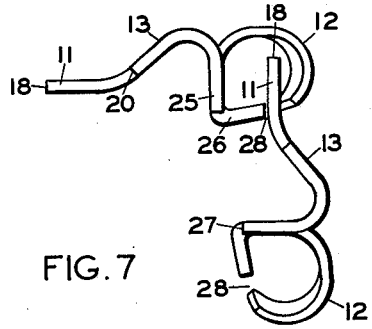
Figure 7 illustrates how two of the adjacent links may be connected to or disconnected from each other.

In assembling the chain links, they are interlocked as indicated in Figures 1, 2, and 3 with the rearward pintle portion 11 of one link being slipped into the front barrel portion 12 of the adjacent link. This is accomplished by positioning one link at right angles to the other and passing the pintle portion 11 vertically and upwardly through the slot 28 as indicated in Figure 7. A reverse movement of the pintle through the slot can disconnect adjacent links. The slot 28 is preferably normally of less width than the thickness of the flat pintle 11, but can be forced wider, this being facilitated by the diverging ends of the slot created by the transverse curvature in the barrel 12.

Figure 9:
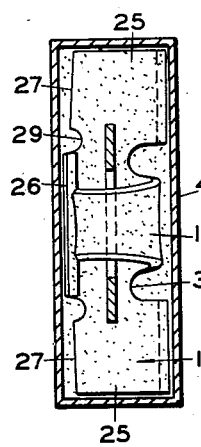
Figure 9 is a transverse sectional view taken along line 9—9 of Figure 8.
Figure 8:
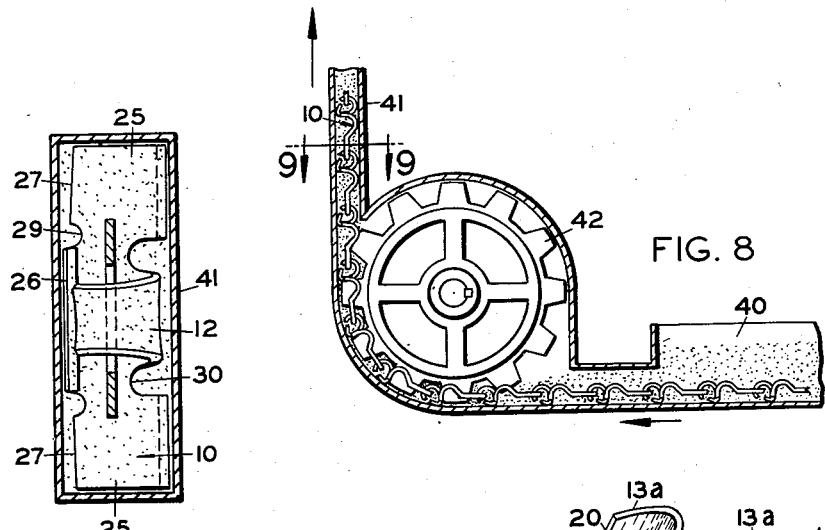
Figure 8 is a vertical sectional view through the conduits of a chicken-feeding device showing that the chain can function to move the feed therein vertically as well as horizontally.

The chain may be used in various ways but in Figures 8 and 9 I have illustrated one installation in which it can be used. This illustration shows it passing through a lower horizontal trough 40 and through a communicating vertical conduit 41 which are of rectangular cross-section and of a width slightly greater than the length of the blade 25 and in the dimension at right angles thereto are slightly greater than the depth of the blade. The chain is passed around the sprockets 42 in a vertical plane. The teeth of these sprockets will successively move into the apertures 14 of the succeeding links and will engage the concave surfaces of the barrel portions 12 of the links to move the chain. The dozer blade 25 will be spaced slightly above the bottom surface of the trough 40 by the bearing lips 26 sliding thereon. The feed will be moved horizontally along this trough 40 by the blades 25. As the chain passes vertically, the blades 25 will serve as elevator cleats for elevating the feed through the conduit 41. As indicated in the sectional view in Figure 9, after the chain has moved through the conduit 41 for a sufficient period at a sufficient speed, the conduit will be substantially filled with a column of material by the lifting action of the blades 25. It will be apparent that the chain can again pass horizontally in another trough 40a to move the feed therealong.

Figure 4:
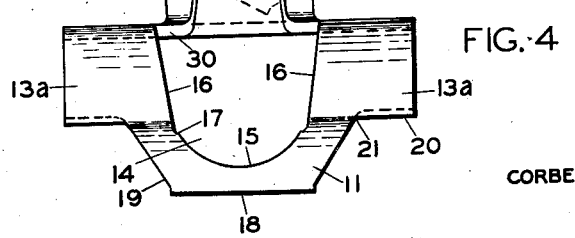
Figure 4 is a view similar to Figure 1 but illustrating how the chain can flex laterally in the plane of the links.
Figure 5:
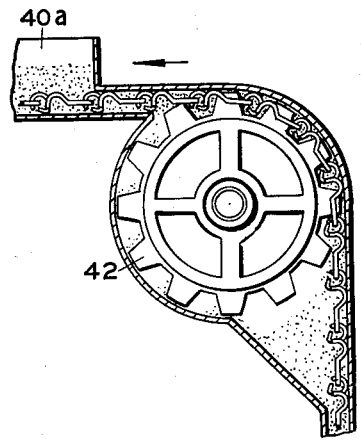
Figure 5 is a perspective view of one of the links.
Figure 5:
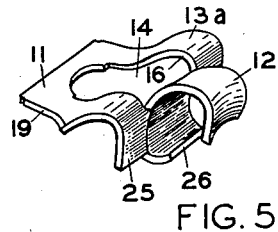
Figure 6:
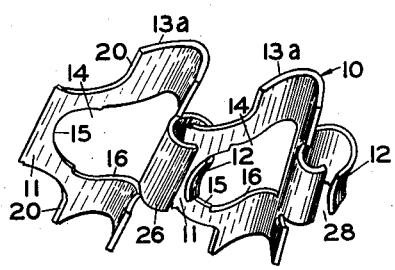
Figure 6 is a perspective view illustrating how one link may twist relative to the other about the longitudinal axis of the chain.

The tension between the sprockets, which engage the outer concave surfaces of the barrels 12, will keep the chain links in lateral alignment in the condition illustrated in Figure 1. The pintle portions 11 will, as shown in Figure 2, fit loosely in the barrel portions 12 to permit considerable movement of the links relative to each other in all directions. As the chain passes vertically around the sprockets, the pintles 11 will turn, rock, or slide in the barrels 12, permitting the necessary vertical flexing of the chain. Horizontal flexing will be permitted, as shown in Figure 4, by having the inside curved edge 15 of the pintle rock or shift on the inner convex bearing surface 30 of the barrel 12. Since the edges 19 between the pintle edge 11 and the wings 13a are angled as indicated, there will be no binding between links when they turn relatively laterally as shown in Figure 4. Twisting of the links relative to each other about the longitudinal axis of the chain will be permitted as shown in Figure 6 because of the loose fit of each pintle 11 in the cooperating barrel 12.

It will be apparent from the above description that I have provided a chain which will effectively move granular material in a conduit extending either horizontally, at an inclination, or vertically. This effective feed to any elevation is provided by the dozer blade on each link which is at right angles relative to the plane of the pintle and is behind the axis of the pintle-receiving portion, said axis being in the plane of the pintle. Thus, the dozer blades of successive links of the chain are normal to the plane of movement of the chain and extend from opposite sides of that plane. The chain is made from interlocking links of inexpensive stampings. The links are so constructed relatively and interfitted with each other that the chain can flex in two planes at right angles to each other and can twist about its longitudinal axis.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. A chain formed from interlocking links, each of said links comprising a rear pintle portion, a forward pintle-receiving barrel portion, and a connecting portion, said connecting portion including a transversely extending upright blade, said barrel portion being of hook form to hook over the pintle portion and having its axis in a common horizontal plane with the pintle portion, said upright blade being behind the axis of the barrel portion and being in a plane substantially normal to the common plane of the pintle portion and barrel axis, said barrel extending forwardly from the upper edge of the upright blade and being turned rearwardly toward the blade, and a forwardly projecting bearing lip on the lower edge of the blade which terminates short of the rear edge of the hook to provide a transverse slot.

2. A chain according to claim 1 in which each link is provided with an aperture for receiving the tooth of a sprocket between the pintle and the hook barrel, said pintle being flat and having a concavely curved forward edge, said hook barrel being of substantially less width than the aperture.

3. A chain according to claim 2 in which the hook barrel has an outer surface concavely curved transversely producing an inner surface which is convexly curved transversely to provide a bearing surface for engaging the said curved inner edge of the pintle of an adjacent link.

References Cited in the file of this patent
UNITED STATES PATENTS

| | | |
|---|---|---|
| 850,149 | Garland | Apr. 16, 1907 |
| 1,087,905 | Horn | Feb. 17, 1914 |
| 2,495,647 | Vaughn et al. | Jan. 24, 1950 |
| 2,672,059 | Graetz et al. | Mar. 16, 1954 |
| 2,782,761 | Martin et al. | Feb. 26, 1957 |
| 2,811,857 | Willauer et al. | Nov. 5, 1957 |